(12) United States Patent
Ahuja et al.

(10) Patent No.: US 8,166,307 B2
(45) Date of Patent: *Apr. 24, 2012

(54) DOCUMENT REGISTRATION

(75) Inventors: Ratinder Paul Singh Ahuja, Saratoga, CA (US); Matthew Howard, Saratoga, CA (US); Rick Lowe, Menlo Park, CA (US); Erik de la Iglesia, Mountain View, CA (US); William Deninger, Mountain View, CA (US)

(73) Assignee: McAffee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,061

(22) Filed: Aug. 31, 2010

(65) Prior Publication Data

US 2011/0219237 A1    Sep. 8, 2011

Related U.S. Application Data

(63) Continuation of application No. 10/815,239, filed on Mar. 30, 2004, now Pat. No. 7,814,327.

(60) Provisional application No. 60/528,631, filed on Dec. 10, 2003.

(51) Int. Cl.
*H04L 29/06* (2006.01)
*G06F 15/173* (2006.01)
*G06F 15/16* (2006.01)

(52) U.S. Cl. ........ 713/177; 709/224; 709/249; 713/162; 713/179; 713/182; 713/168

(58) Field of Classification Search .......................... None
See application file for complete search history.

(56) References Cited

U.S. PATENT DOCUMENTS 4,286,255 A    8/1981    Siy
4,710,957 A   12/1987    Bocci et al.
(Continued)

FOREIGN PATENT DOCUMENTS

WO    WO 2004/008310 A2    1/2004

OTHER PUBLICATIONS

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, printed Mar. 12, 2009.

(Continued)

*Primary Examiner* — Shin-Hon Chen
(74) *Attorney, Agent, or Firm* — Patent Capital Group

(57) ABSTRACT

A document accessible over a network can be registered. A registered document, and the content contained therein, cannot be transmitted undetected over and off of the network. In one embodiment, the invention includes maintaining a plurality of stored signatures, each signature being associated with one of a plurality of registered documents, intercepting an object being transmitted over a network, calculating a set of signatures associated with the intercepted object, and comparing the set of signatures with the plurality of stored signatures. In one embodiment, the invention can further include detecting registered content from the registered document being contained in the intercepted object, if the comparison results in a match of at least one of the signatures in the set of signatures with one or more of the plurality of stored signatures.

20 Claims, 8 Drawing Sheets

U.S. PATENT DOCUMENTS

| | | | |
|---|---|---|---|
| 5,249,289 A | 9/1993 | Thamm et al. | |
| 5,465,299 A | 11/1995 | Matsumoto et al. | |
| 5,479,654 A | 12/1995 | Squibb | |
| 5,497,489 A | 3/1996 | Menne | |
| 5,542,090 A | 7/1996 | Henderson et al. | |
| 5,557,747 A | 9/1996 | Rogers et al. | |
| 5,623,652 A | 4/1997 | Vora et al. | |
| 5,768,578 A | 6/1998 | Kirk | |
| 5,781,629 A | 7/1998 | Haber et al. | |
| 5,794,052 A | 8/1998 | Harding | |
| 5,813,009 A | 9/1998 | Johnson et al. | |
| 5,873,081 A | 2/1999 | Harel | |
| 5,937,422 A | 8/1999 | Nelson et al. | |
| 5,943,670 A | 8/1999 | Prager | |
| 5,995,111 A | 11/1999 | Morioka et al. | |
| 6,026,411 A | 2/2000 | Delp | |
| 6,078,953 A | 6/2000 | Vaid et al. | |
| 6,094,531 A | 7/2000 | Allison et al. | |
| 6,108,697 A | 8/2000 | Raymond et al. | |
| 6,161,102 A | 12/2000 | Yanaglhara et al. | |
| 6,175,867 B1 | 1/2001 | Taghadoss | |
| 6,192,472 B1 | 2/2001 | Garay et al. | |
| 6,243,091 B1 | 6/2001 | Berstis | |
| 6,243,720 B1 | 6/2001 | Munter et al. | |
| 6,278,992 B1 | 8/2001 | Curtis et al. | |
| 6,292,810 B1 | 9/2001 | Richards | |
| 6,336,186 B1 | 1/2002 | Dyksterhouse et al. | |
| 6,343,376 B1 | 1/2002 | Saxe et al. | |
| 6,356,885 B2 | 3/2002 | Ross et al. | |
| 6,363,488 B1 * | 3/2002 | Ginter et al. | 726/1 |
| 6,389,405 B1 | 5/2002 | Oatman et al. | |
| 6,389,419 B1 | 5/2002 | Wong et al. | |
| 6,408,294 B1 | 6/2002 | Getchius et al. | |
| 6,408,301 B1 | 6/2002 | Patton et al. | |
| 6,457,017 B2 | 9/2002 | Watkins et al. | |
| 6,493,761 B1 | 12/2002 | Baker et al. | |
| 6,499,105 B1 | 12/2002 | Yoshiura et al. | |
| 6,502,091 B1 | 12/2002 | Chundi et al. | |
| 6,515,681 B1 | 2/2003 | Knight | |
| 6,516,320 B1 | 2/2003 | Odom et al. | |
| 6,523,026 B1 | 2/2003 | Gillis | |
| 6,539,024 B1 | 3/2003 | Janoska et al. | |
| 6,556,964 B2 | 4/2003 | Haug et al. | |
| 6,556,983 B1 | 4/2003 | Altschuler et al. | |
| 6,571,275 B1 | 5/2003 | Dong et al. | |
| 6,584,458 B1 | 6/2003 | Millett et al. | |
| 6,598,033 B2 | 7/2003 | Ross et al. | |
| 6,629,097 B1 | 9/2003 | Keith | |
| 6,662,176 B2 | 12/2003 | Brunet et al. | |
| 6,665,662 B1 | 12/2003 | Kirkwood et al. | |
| 6,675,159 B1 | 1/2004 | Lin et al. | |
| 6,691,209 B1 | 2/2004 | O'Connell | |
| 6,754,647 B1 | 6/2004 | Tackett et al. | |
| 6,757,646 B2 | 6/2004 | Marchisio | |
| 6,771,595 B1 | 8/2004 | Gilbert et al. | |
| 6,772,214 B1 | 8/2004 | McClain et al. | |
| 6,785,815 B1 | 8/2004 | Serret-Avila et al. | |
| 6,804,627 B1 | 10/2004 | Marokhovsky et al. | |
| 6,820,082 B1 | 11/2004 | Cook et al. | |
| 6,857,011 B2 | 2/2005 | Reinke | |
| 6,937,257 B1 | 8/2005 | Dunlavey | |
| 6,950,864 B1 | 9/2005 | Tsuchiya | |
| 6,978,297 B1 | 12/2005 | Piersol | |
| 7,020,654 B1 | 3/2006 | Najmi | |
| 7,020,661 B1 | 3/2006 | Cruanes et al. | |
| 7,062,572 B1 | 6/2006 | Hampton | |
| 7,072,967 B1 | 7/2006 | Saulpaugh et al. | |
| 7,082,443 B1 | 7/2006 | Ashby | |
| 7,093,288 B1 * | 8/2006 | Hydrie et al. | 726/13 |
| 7,130,587 B2 | 10/2006 | Hikokubo et al. | |
| 7,158,983 B2 | 1/2007 | Willse et al. | |
| 7,185,073 B1 | 2/2007 | Gai et al. | |
| 7,185,192 B1 | 2/2007 | Kahn | |
| 7,194,483 B1 | 3/2007 | Mohan et al. | |
| 7,219,131 B2 | 5/2007 | Banister et al. | |
| 7,219,134 B2 | 5/2007 | Takeshima et al. | |
| 7,243,120 B2 | 7/2007 | Massey | |
| 7,246,236 B2 | 7/2007 | Stirbu | |
| 7,254,562 B2 | 8/2007 | Hsu et al. | |
| 7,254,632 B2 | 8/2007 | Zeira et al. | |
| 7,266,845 B2 | 9/2007 | Hypponen | |
| 7,272,724 B2 | 9/2007 | Tarbotton et al. | |
| 7,277,957 B2 | 10/2007 | Rowley et al. | |
| 7,290,048 B1 | 10/2007 | Barnett et al. | |
| 7,293,067 B1 | 11/2007 | Maki et al. | |
| 7,293,238 B1 | 11/2007 | Brook et al. | |
| 7,296,070 B2 | 11/2007 | Sweeney et al. | |
| 7,296,088 B1 | 11/2007 | Padmanabhan et al. | |
| 7,296,232 B1 | 11/2007 | Burdick et al. | |
| 7,299,277 B1 | 11/2007 | Moran et al. | |
| 7,373,500 B2 | 5/2008 | Ramelson et al. | |
| 7,424,744 B1 | 9/2008 | Wu et al. | |
| 7,426,181 B1 | 9/2008 | Feroz et al. | |
| 7,434,058 B2 | 10/2008 | Ahuja et al. | |
| 7,467,202 B2 | 12/2008 | Savchuk | |
| 7,477,780 B2 | 1/2009 | Boncyk et al. | |
| 7,483,916 B2 | 1/2009 | Lowe et al. | |
| 7,493,659 B1 | 2/2009 | Wu et al. | |
| 7,505,463 B2 | 3/2009 | Schuba et al. | |
| 7,506,055 B2 | 3/2009 | McClain et al. | |
| 7,509,677 B2 | 3/2009 | Saurabh et al. | |
| 7,516,492 B1 | 4/2009 | Nisbet et al. | |
| 7,551,629 B2 | 6/2009 | Chen et al. | |
| 7,577,154 B1 | 8/2009 | Yung et al. | |
| 7,581,059 B2 | 8/2009 | Gupta et al. | |
| 7,596,571 B2 | 9/2009 | Sifry | |
| 7,657,104 B2 | 2/2010 | Deninger et al. | |
| 7,664,083 B1 | 2/2010 | Cermak et al. | |
| 7,685,254 B2 | 3/2010 | Pandya | |
| 7,689,614 B2 | 3/2010 | de la Iglesia et al. | |
| 7,730,011 B1 | 6/2010 | Deninger et al. | |
| 7,760,730 B2 | 7/2010 | Goldschmidt et al. | |
| 7,760,769 B1 | 7/2010 | Lovett et al. | |
| 7,774,604 B2 | 8/2010 | Lowe et al. | |
| 7,814,327 B2 | 10/2010 | Ahuja et al. | |
| 7,818,326 B2 | 10/2010 | Deninger et al. | |
| 7,899,828 B2 | 3/2011 | de la Iglesia et al. | |
| 7,907,608 B2 | 3/2011 | Liu et al. | |
| 7,930,540 B2 | 4/2011 | Ahuja et al. | |
| 7,949,849 B2 | 5/2011 | Lowe et al. | |
| 7,958,227 B2 | 6/2011 | Ahuja et al. | |
| 7,962,591 B2 | 6/2011 | Deninger et al. | |
| 7,984,175 B2 | 7/2011 | de La Iglesia et al. | |
| 8,005,863 B2 | 8/2011 | de La Iglesia et al. | |
| 8,010,689 B2 | 8/2011 | Deninger et al. | |
| 2001/0032310 A1 | 10/2001 | Corella | |
| 2001/0037324 A1 | 11/2001 | Agrawal et al. | |
| 2001/0046230 A1 | 11/2001 | Rojas | |
| 2002/0032677 A1 | 3/2002 | Morgenthaler et al. | |
| 2002/0032772 A1 * | 3/2002 | Olstad et al. | 709/224 |
| 2002/0052896 A1 | 5/2002 | Streit et al. | |
| 2002/0065956 A1 | 5/2002 | Yagawa et al. | |
| 2002/0078355 A1 | 6/2002 | Samar | |
| 2002/0091579 A1 | 7/2002 | Yehia et al. | |
| 2002/0103876 A1 | 8/2002 | Chatani et al. | |
| 2002/0107843 A1 | 8/2002 | Biebesheimer et al. | |
| 2002/0116124 A1 | 8/2002 | Garin et al. | |
| 2002/0126673 A1 | 9/2002 | Dagli et al. | |
| 2002/0128903 A1 | 9/2002 | Kernahan | |
| 2002/0129140 A1 * | 9/2002 | Peled et al. | 709/224 |
| 2002/0159447 A1 | 10/2002 | Carey et al. | |
| 2003/0009718 A1 | 1/2003 | Wolfgang et al. | |
| 2003/0028493 A1 * | 2/2003 | Tajima et al. | 705/67 |
| 2003/0028774 A1 | 2/2003 | Meka | |
| 2003/0046369 A1 | 3/2003 | Sim et al. | |
| 2003/0053420 A1 | 3/2003 | Duckett et al. | |
| 2003/0065571 A1 | 4/2003 | Dutta | |
| 2003/0084300 A1 * | 5/2003 | Koike | 713/182 |
| 2003/0084318 A1 | 5/2003 | Schertz | |
| 2003/0084326 A1 * | 5/2003 | Tarquini | 713/200 |
| 2003/0093678 A1 | 5/2003 | Bowe et al. | |
| 2003/0099243 A1 | 5/2003 | Oh et al. | |
| 2003/0105716 A1 | 6/2003 | Sutton et al. | |
| 2003/0105739 A1 | 6/2003 | Essafi et al. | |
| 2003/0105854 A1 | 6/2003 | Thorsteinsson et al. | |
| 2003/0131116 A1 | 7/2003 | Jain et al. | |
| 2003/0135612 A1 | 7/2003 | Huntington | |

| | | | | | | |
|---|---|---|---|---|---|---|
| 2003/0167392 | A1* | 9/2003 | Fransdonk ............ 713/156 | 2006/0037072 | A1 | 2/2006 | Rao et al. |
| 2003/0185220 | A1 | 10/2003 | Valenci | 2006/0041560 | A1 | 2/2006 | Forman et al. |
| 2003/0196081 | A1 | 10/2003 | Savarda et al. | 2006/0041570 | A1 | 2/2006 | Lowe et al. |
| 2003/0204741 | A1 | 10/2003 | Schoen et al. | 2006/0041760 | A1 | 2/2006 | Huang |
| 2003/0221101 | A1 | 11/2003 | Micali | 2006/0047675 | A1 | 3/2006 | Lowe et al. |
| 2003/0225796 | A1 | 12/2003 | Matsubara | 2006/0075228 | A1 | 4/2006 | Black et al. |
| 2003/0225841 | A1 | 12/2003 | Song et al. | 2006/0080130 | A1 | 4/2006 | Choksi |
| 2003/0231632 | A1 | 12/2003 | Haeberlen | 2006/0083180 | A1 | 4/2006 | Baba et al. |
| 2003/0233411 | A1 | 12/2003 | Parry et al. | 2006/0106793 | A1 | 5/2006 | Liang |
| 2004/0001498 | A1* | 1/2004 | Chen et al. ............ 370/401 | 2006/0106866 | A1 | 5/2006 | Green et al. |
| 2004/0010484 | A1 | 1/2004 | Foulger et al. | 2006/0150249 | A1 | 7/2006 | Gassen et al. |
| 2004/0015579 | A1 | 1/2004 | Cooper et al. | 2006/0167896 | A1 | 7/2006 | Kapur et al. |
| 2004/0036716 | A1 | 2/2004 | Jordahl | 2006/0184532 | A1 | 8/2006 | Hamada et al. |
| 2004/0054779 | A1 | 3/2004 | Takeshima et al. | 2006/0242126 | A1 | 10/2006 | Fitzhugh |
| 2004/0059736 | A1 | 3/2004 | Willse et al. | 2006/0242313 | A1 | 10/2006 | Le et al. |
| 2004/0059920 | A1 | 3/2004 | Godwin | 2006/0251109 | A1 | 11/2006 | Muller et al. |
| 2004/0071164 | A1 | 4/2004 | Baum | 2006/0253445 | A1 | 11/2006 | Huang et al. |
| 2004/0111406 | A1 | 6/2004 | Udeshi et al. | 2006/0272024 | A1 | 11/2006 | Huang et al. |
| 2004/0111678 | A1 | 6/2004 | Hara | 2006/0288216 | A1 | 12/2006 | Buhler et al. |
| 2004/0114518 | A1 | 6/2004 | MacFaden et al. | 2007/0006293 | A1 | 1/2007 | Balakrishnan et al. |
| 2004/0117414 | A1 | 6/2004 | Braun et al. | 2007/0011309 | A1 | 1/2007 | Brady et al. |
| 2004/0120325 | A1 | 6/2004 | Ayres | 2007/0028039 | A1 | 2/2007 | Gupta et al. |
| 2004/0122863 | A1 | 6/2004 | Sidman | 2007/0036156 | A1 | 2/2007 | Liu et al. |
| 2004/0139120 | A1 | 7/2004 | Clark et al. | 2007/0050334 | A1 | 3/2007 | Deninger et al. |
| 2004/0181513 | A1 | 9/2004 | Henderson et al. | 2007/0050381 | A1 | 3/2007 | Hu et al. |
| 2004/0181690 | A1 | 9/2004 | Rothermel et al. | 2007/0050467 | A1 | 3/2007 | Borrett et al. |
| 2004/0194141 | A1 | 9/2004 | Sanders | 2007/0081471 | A1 | 4/2007 | Talley et al. |
| 2004/0196970 | A1 | 10/2004 | Cole | 2007/0094394 | A1 | 4/2007 | Singh et al. |
| 2004/0205457 | A1 | 10/2004 | Bent et al. | 2007/0110089 | A1 | 5/2007 | Essafi et al. |
| 2004/0215612 | A1 | 10/2004 | Brody | 2007/0112838 | A1 | 5/2007 | Bjarnestam et al. |
| 2004/0220944 | A1 | 11/2004 | Behrens et al. | 2007/0116366 | A1 | 5/2007 | Deninger et al. |
| 2004/0230572 | A1 | 11/2004 | Omoigui | 2007/0136599 | A1 | 6/2007 | Suga |
| 2004/0249781 | A1 | 12/2004 | Anderson | 2007/0162609 | A1 | 7/2007 | Pope et al. |
| 2004/0267753 | A1 | 12/2004 | Hoche | 2007/0226504 | A1 | 9/2007 | de la Iglesia et al. |
| 2005/0004911 | A1 | 1/2005 | Goldberg et al. | 2007/0226510 | A1 | 9/2007 | de la Iglesia et al. |
| 2005/0021715 | A1 | 1/2005 | Dugatkin et al. | 2007/0248029 | A1 | 10/2007 | Merkey et al. |
| 2005/0021743 | A1 | 1/2005 | Fleig et al. | 2007/0271254 | A1 | 11/2007 | de la Iglesia et al. |
| 2005/0022114 | A1 | 1/2005 | Shanahan et al. | 2007/0271371 | A1 | 11/2007 | Ahuja et al. |
| 2005/0027881 | A1 | 2/2005 | Figueira et al. | 2007/0271372 | A1 | 11/2007 | Deninger et al. |
| 2005/0033747 | A1 | 2/2005 | Wittkotter | 2007/0280123 | A1 | 12/2007 | Atkins et al. |
| 2005/0033803 | A1 | 2/2005 | Vleet et al. | 2008/0028467 | A1 | 1/2008 | Kommareddy et al. |
| 2005/0038788 | A1 | 2/2005 | Dettinger et al. | 2008/0091408 | A1 | 4/2008 | Roulland et al. |
| 2005/0038809 | A1 | 2/2005 | Abajian et al. | 2008/0235163 | A1 | 9/2008 | Balasubramanian et al. |
| 2005/0050205 | A1 | 3/2005 | Gordy et al. | 2009/0100055 | A1 | 4/2009 | Wang |
| 2005/0055327 | A1 | 3/2005 | Agrawal et al. | 2009/0178110 | A1 | 7/2009 | Higuchi |
| 2005/0055399 | A1 | 3/2005 | Savchuk | 2009/0187568 | A1 | 7/2009 | Morin |
| 2005/0075103 | A1 | 4/2005 | Hikokubo et al. | 2009/0232391 | A1 | 9/2009 | Deninger et al. |
| 2005/0091443 | A1 | 4/2005 | Hershkovich et al. | 2009/0300709 | A1 | 12/2009 | Chen et al. |
| 2005/0091532 | A1 | 4/2005 | Moghe | 2010/0011410 | A1 | 1/2010 | Liu |
| 2005/0097441 | A1 | 5/2005 | Herbach et al. | 2010/0121853 | A1 | 5/2010 | de la Iglesia et al. |
| 2005/0108244 | A1 | 5/2005 | Riise et al. | 2010/0185622 | A1 | 7/2010 | Deninger et al. |
| 2005/0114452 | A1 | 5/2005 | Prakash | 2010/0191732 | A1 | 7/2010 | Lowe et al. |
| 2005/0120006 | A1 | 6/2005 | Nye | 2010/0268959 | A1 | 10/2010 | Lowe et al. |
| 2005/0127171 | A1 | 6/2005 | Ahuja et al. | 2011/0004599 | A1 | 1/2011 | Deninger et al. |
| 2005/0128242 | A1 | 6/2005 | Suzuki | 2011/0131199 | A1 | 6/2011 | Simon et al. |
| 2005/0131876 | A1 | 6/2005 | Ahuja et al. | 2011/0149959 | A1 | 6/2011 | Liu et al. |
| 2005/0132034 | A1 | 6/2005 | de la Iglesia et al. | 2011/0167212 | A1 | 7/2011 | Lowe et al. |
| 2005/0132046 | A1 | 6/2005 | de la Iglesia et al. | 2011/0167265 | A1 | 7/2011 | Ahuja et al. |
| 2005/0132079 | A1 | 6/2005 | de la Iglesia et al. | 2011/0196911 | A1 | 8/2011 | de la Iglesia et al. |
| 2005/0132197 | A1 | 6/2005 | Medlar | 2011/0197284 | A1 | 8/2011 | Ahuja et al. |
| 2005/0132198 | A1 | 6/2005 | Ahuja et al. | 2011/0208861 | A1 | 8/2011 | Deninger et al. |
| 2005/0132297 | A1 | 6/2005 | Milic-Frayling et al. | 2011/0258197 | A1 | 10/2011 | de la Iglesia et al. |
| 2005/0138242 | A1 | 6/2005 | Pope et al. | 2011/0276575 | A1 | 11/2011 | de la Iglesia et al. |
| 2005/0138279 | A1 | 6/2005 | Somasundaram | 2011/0276709 | A1 | 11/2011 | Deninger et al. |
| 2005/0149494 | A1 | 7/2005 | Lindh et al. | | | | |
| 2005/0149504 | A1 | 7/2005 | Ratnaparkhi | | | | |
| 2005/0166066 | A1 | 7/2005 | Ahuja et al. | | | | |
| 2005/0177725 | A1 | 8/2005 | Lowe et al. | | | | |
| 2005/0180341 | A1 | 8/2005 | Nelson et al. | | | | |
| 2005/0182765 | A1 | 8/2005 | Liddy | | | | |
| 2005/0188218 | A1 | 8/2005 | Walmsley et al. | | | | |
| 2005/0203940 | A1 | 9/2005 | Farrar et al. | | | | |
| 2005/0204129 | A1 | 9/2005 | Sudia et al. | | | | |
| 2005/0228864 | A1 | 10/2005 | Robertson | | | | |
| 2005/0235153 | A1 | 10/2005 | Ikeda | | | | |
| 2005/0289181 | A1 | 12/2005 | Deninger et al. | | | | |
| 2006/0005247 | A1 | 1/2006 | Zhang et al. | | | | |
| 2006/0021045 | A1 | 1/2006 | Cook | | | | |
| 2006/0021050 | A1 | 1/2006 | Cook et al. | | | | |

OTHER PUBLICATIONS

Office Action from U.S. Appl. No. 11/388,734, mailed Feb. 5, 2008, 12 pages.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the 3$^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.

U.S. Appl. No. 11/900,964, filed Sep. 14, 2007, entitled "System and Method for Indexing a Capture System," Inventor(s) Ashok Doddapaneni et al.

Microsoft Outlook, Out look, copyright 1995-2000, 2 pages.

Office Action from U.S. Appl. No. 10/815,239, mailed Feb. 8, 2008 (8 pages).

Office Action from U.S. Appl. No. 10/815,239, mailed Jun. 13, 2007 (8 pages).

Han, OLAP Mining: An Integration of OLAP with Data Mining, Oct. 1997, pp. 1-18.

Niemi, Constructing OLAP Cubes Based on Queries, Nov. 2001, pp. 1-7.

Schultz, Data Mining for Detection of New Malicious Executables, May 2001, pp. 1-13.

U.S. Appl. No. 12/829,220, filed Jul. 1, 2010, entitled "Verifying Captured Objects Before Presentation," Inventor(s) Rick Lowe, et al.

U.S. Appl. No. 12/873,860, filed Sep. 1, 2010, entitled "A System and Method for Word Indexing in a Capture System and Querying Thereof," Inventor(s) William Deninger, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al.

U.S. Appl. No. 13/024,923, filed Feb. 10, 2011, entitled "High Speed Packet Capture," Inventor(s) Weimin Liu, et al.

U.S. Appl. No. 13/047,068, filed Mar. 14, 2011, entitled "Cryptographic Policy Enforcement," Inventor(s) Ratinder Paul Singh Ahuja, et al.

U.S. Appl. No. 13/049,533, filed Mar. 16, 2011, entitled "File System for a Capture System," Inventor(s) Rick Lowe, et al.

U.S. Appl. No. 13/089,158, filed Apr. 18, 2011, entitled "Attributes of Captured Objects in a Capture System," Inventor(s) Ratinder Paul Singh Ahuja, et al.

U.S. Appl. No. 13/099,516, filed May 3, 2011, entitled "Object Classification in a Capture System," Inventor(s) William Deninger, et al.

U.S. Appl. No. 13/168,739, filed Jun. 24, 2011, entitled "Method and Apparatus for Data Capture and Analysis System," Inventor(s) Erik de la Iglesia, et al.

U.S. Appl. No. 13/187,421, filed Jul. 20, 2011, entitled "Query Generation for a Capture System," Inventor(s) Erik de la Iglesia, et al.

U.S. Appl. No. 13/188,441, filed Jul. 21, 2011, entitled "Locational Tagging in a Capture System," Inventor(s) William Deninger et al.

International Search Report and Written Opinion and Declaration of Non-Establishment of International Search Report for International Application No. PCT/US2011/024902 mailed Aug. 1, 2011 (8 pages).

T. Werth, A. Dreweke, I. Fischer, M. Philippsen; DAG Mining in Procedural Abstraction; Programming Systems Group; Computer Science Department, University of Erlangen-Nuremberg, Germany, in Sep. 19, 2011 Nonfinal Rejection.

Webopedia, definition of "filter", 2002, p. 1.

Mao et al. "MOT: Memory Online Tracing of Web Information System," Proceedings of the Second International Conference on Web Information Systems Engineering (WISE '01); pp. 271-277, (IEEE0-0/7695-1393-X/02) Aug. 7, 2002 (7 pages).

* cited by examiner

DOCUMENT REGISTRATION

PRIORITY AND RELATED APPLICATIONS

This Application is a continuation (and claims the benefit of priority under 35 U.S.C. §120) of U.S. application Ser. No. 10/815,239, filed Mar. 30, 2004, now U.S. Pat. No. 7,814,327 entitled "DOCUMENT REGISTRATION," Inventor(s) Ratinder Paul Singh Ahuja, et al. The disclosure of the prior application is considered part of (and is incorporated by reference in) the disclosure of this application.

This patent application is related to, incorporates by reference, and claims the priority benefit of U.S. Provisional Application 60/528,631, entitled "DOCUMENT REGISTRATION", filed Dec. 10, 2003.

FIELD OF THE INVENTION

The present invention relates to computer networks, and in particular, to registering documents in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyze the data leaving the network to monitor for policy violations, and make it possible to track down information leaks. What is needed is a comprehensive system to capture, store, and analyze all data communicated using the enterprise's network.

SUMMARY OF THE INVENTION

A document accessible over a network can be registered. A registered document, and the content contained therein, cannot be transmitted undetected over and off of the network. In one embodiment, the invention includes maintaining a plurality of stored signatures, each signature being associated with one of a plurality of registered documents, intercepting an object being transmitted over a network, calculating a set of signatures associated with the intercepted object, and comparing the set of signatures with the plurality of stored signatures. In one embodiment, the invention can further include detecting registered content from the registered document being contained in the intercepted object, if the comparison results in a match of at least one of the signatures in the set of signatures with one or more of the plurality of stored signatures.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
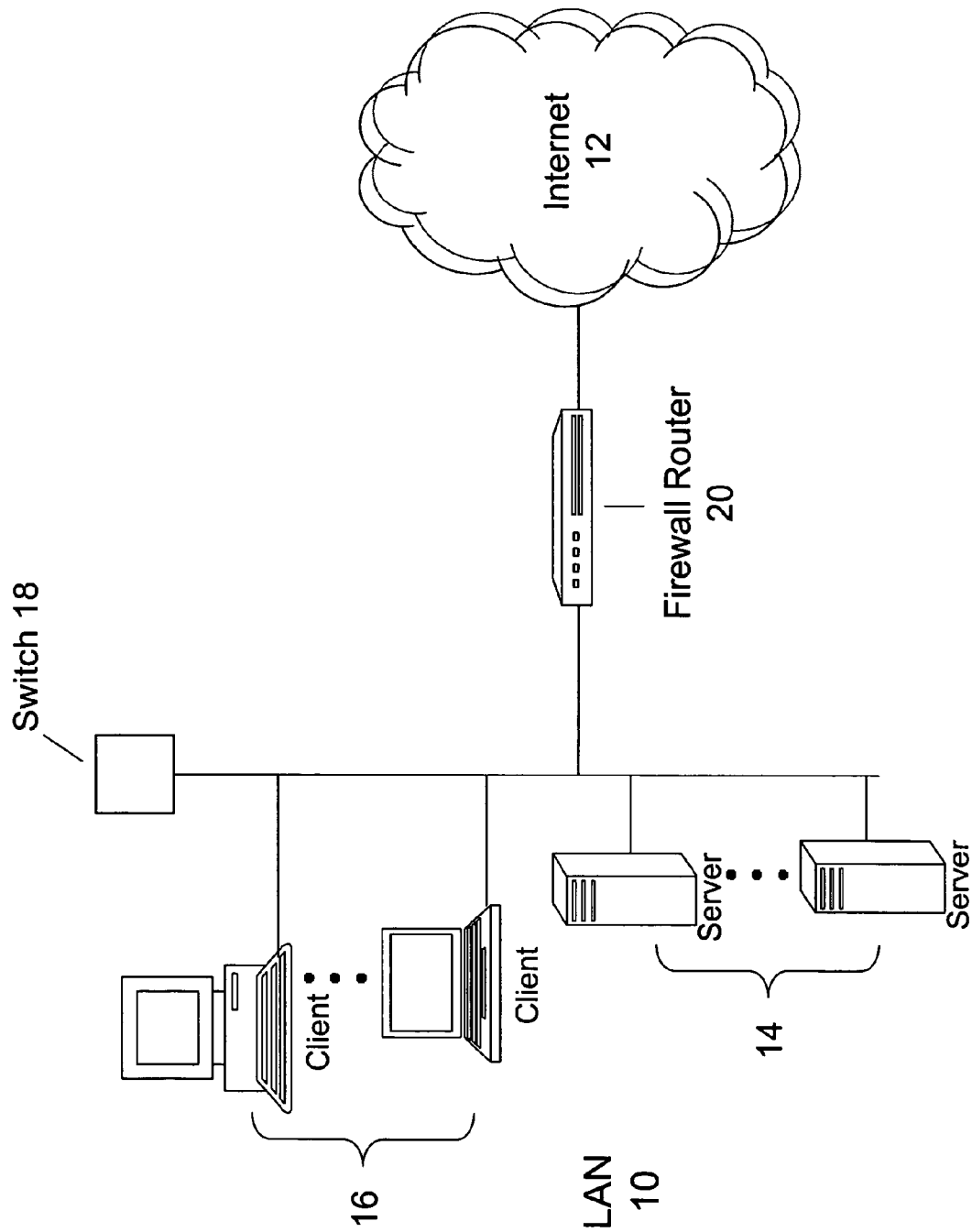
FIG. 1 is a block diagram illustrating a computer network connected to the Internet.

FIG. 1 illustrates a simple prior art configuration of a local area network (LAN) 10 connected to the Internet 12. Connected to the LAN 10 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 20. However, there the router 20 merely forwards packets to the Internet 12. The router 20 cannot capture, analyze, and store, in a searchable manner, the content contained in the forwarded packets.

Figure 2:
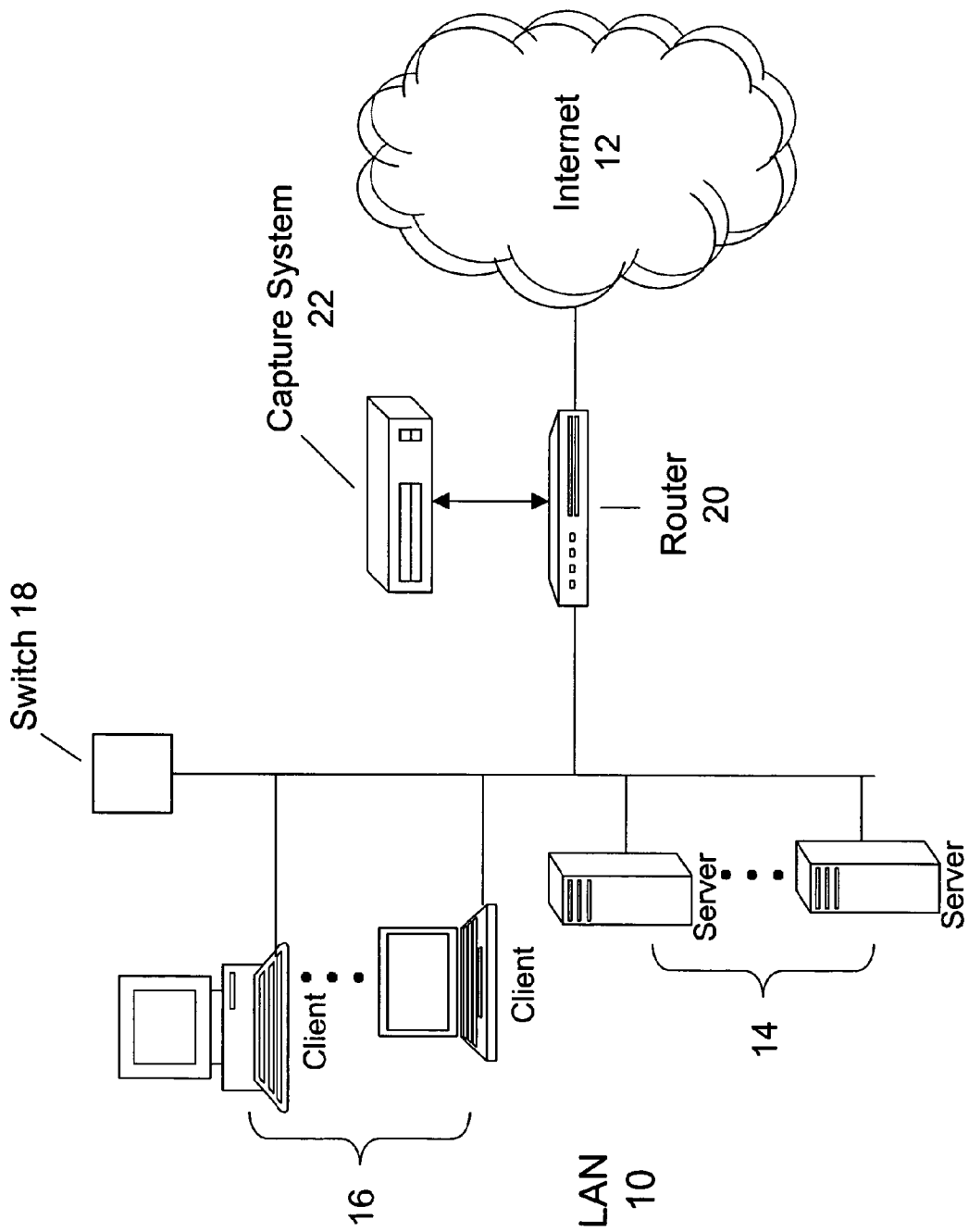
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 20 splits the outgoing data stream, and forwards one copy to the Internet 12 and the other copy to the capture system 22.

There are various other possible configurations. For example, the router 20 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 20 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
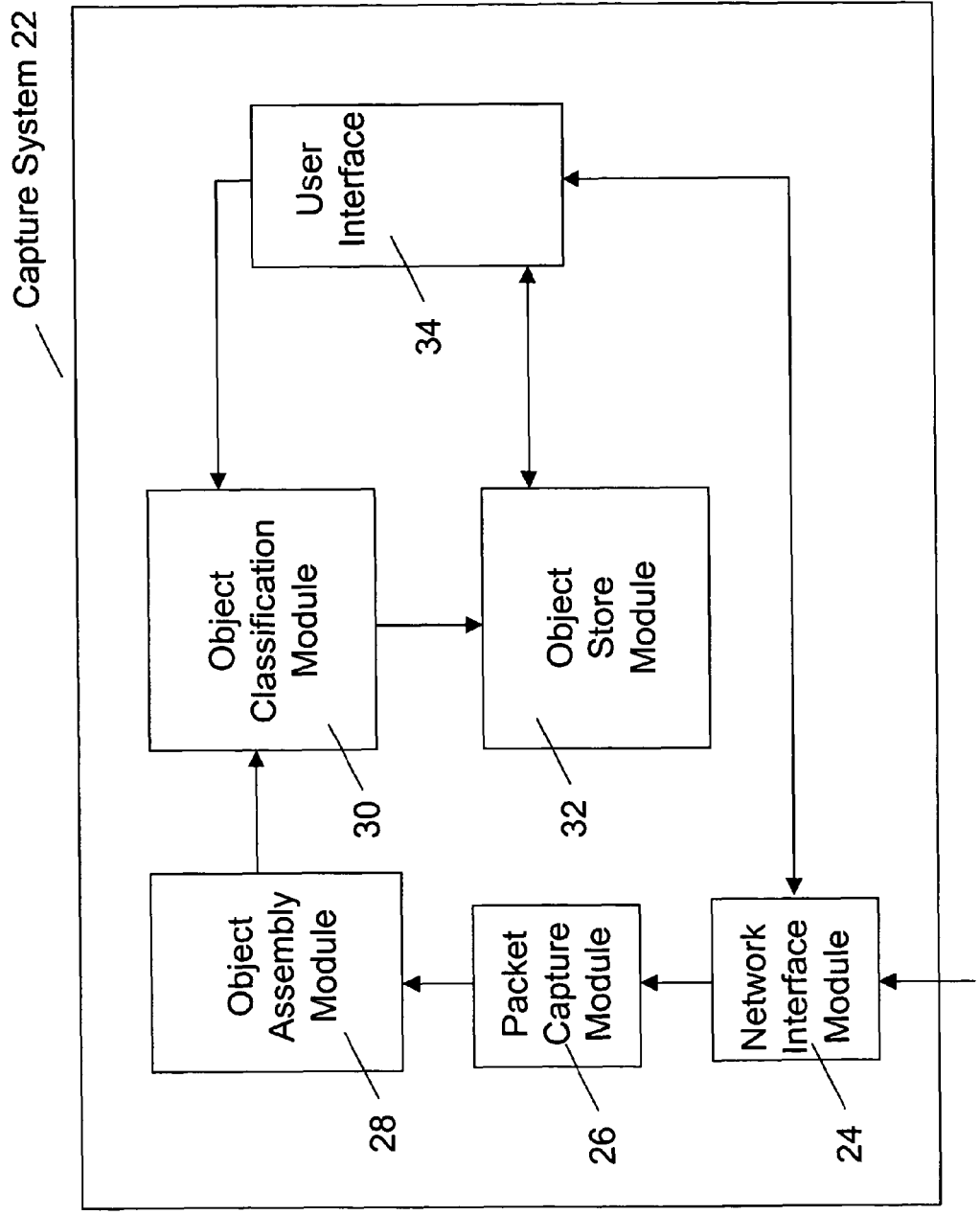
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 is also sometimes referred to as a content analyzer, content or data analysis system, and other similar names. In one embodiment, the capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
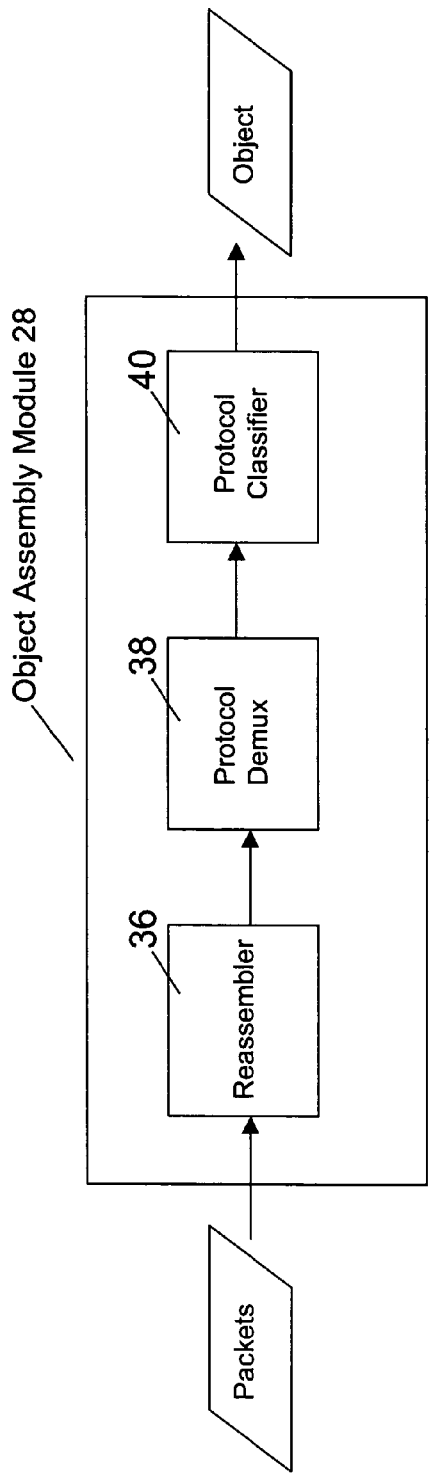
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TCP protocol, a TCP flow contains an ordered sequence of packets that can be assembled into a contiguous data stream by the reassembler 36. Thus, in one embodiment, a flow is an ordered data stream of a single communication between a source and a destination.

The flow assembled by the reassembler 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
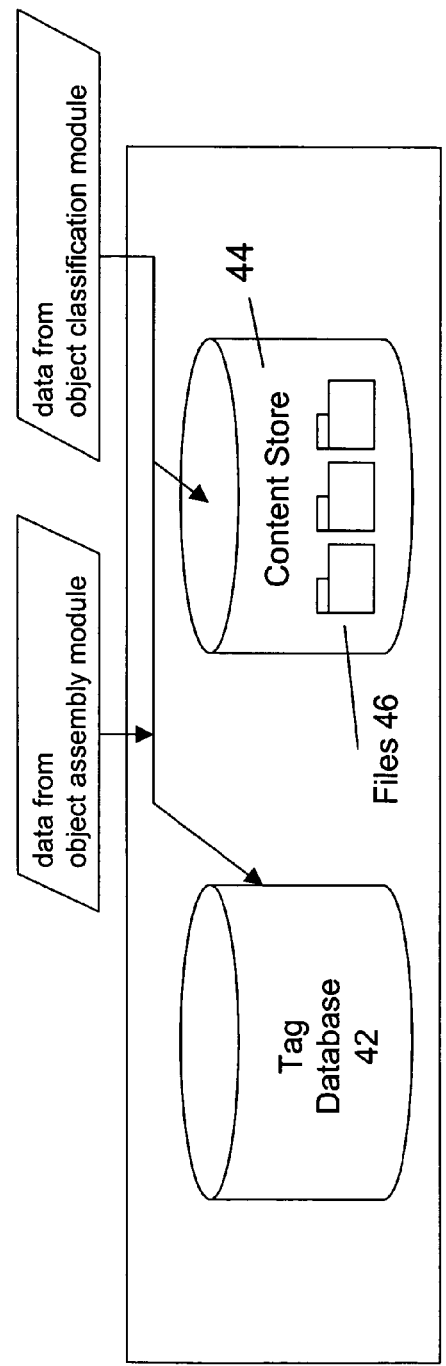
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44, and contains relevant information about the stored object. An example of a tag record in the tag database 42 that indexes an objected stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database; other data structures can be used. The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

Referring again to FIG. 3, in one embodiment, the objects and tags stored in the object store module 32 can be interactively queried by a user via the user interface 34. In one embodiment the user interface can interact with a web server (not shown) to provide the user with Web-based access to the capture system 22. The objects in the content store module 32 can thus be searched for specific textual or graphical content using exact matches, patterns, keywords, and various other advanced attributes.

For example, the user interface 34 can provide a query-authoring tool (not shown) to enable users to create complex searches of the object store module 32. These search queries can be provided to a data mining engine (not shown) that parses the queries, scans the tag database 42, and retrieves the found object from the content store 44. Then, these objects that matched the specific search criteria in the user-authored query can be counted and displayed to the user by the user interface 34.

Searches can also be scheduled to occur at specific times or at regular intervals, that is, the user interface 34 can provide access to a scheduler (not shown) that can periodically execute specific queries. Reports containing the results of these searches can be made available to the user at a later time, mailed to the administrator electronically, or used to generate an alarm in the form of an e-mail message, page, syslog or other notification format.

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
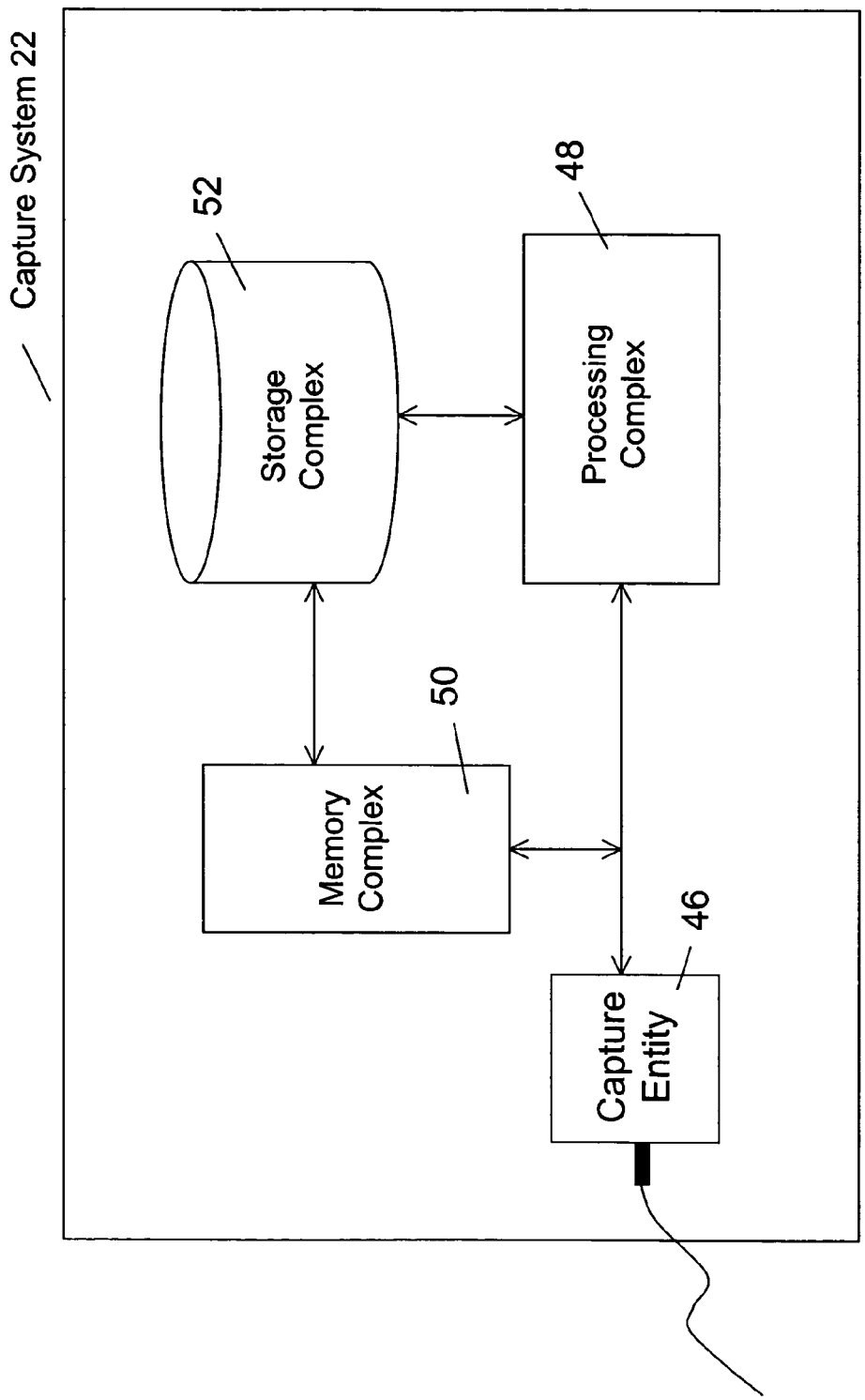
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Document Registration

The capture system 22 described above can also be used to implement a document registration scheme. In one embodiment, the user can register a document with the system 22, which can then alert the user if all or part of the content in the registered document is leaving the network. Thus, one embodiment of the present invention aims to prevent unauthorized documents of various formats (e.g., Microsoft Word, Excel, PowerPoint, source code of any kind, text) from leaving an enterprise. There are great benefits to any enterprise that can keep its intellectual property, or other critical, confidential, or otherwise private and proprietary content from being mishandled.

Figure 7:
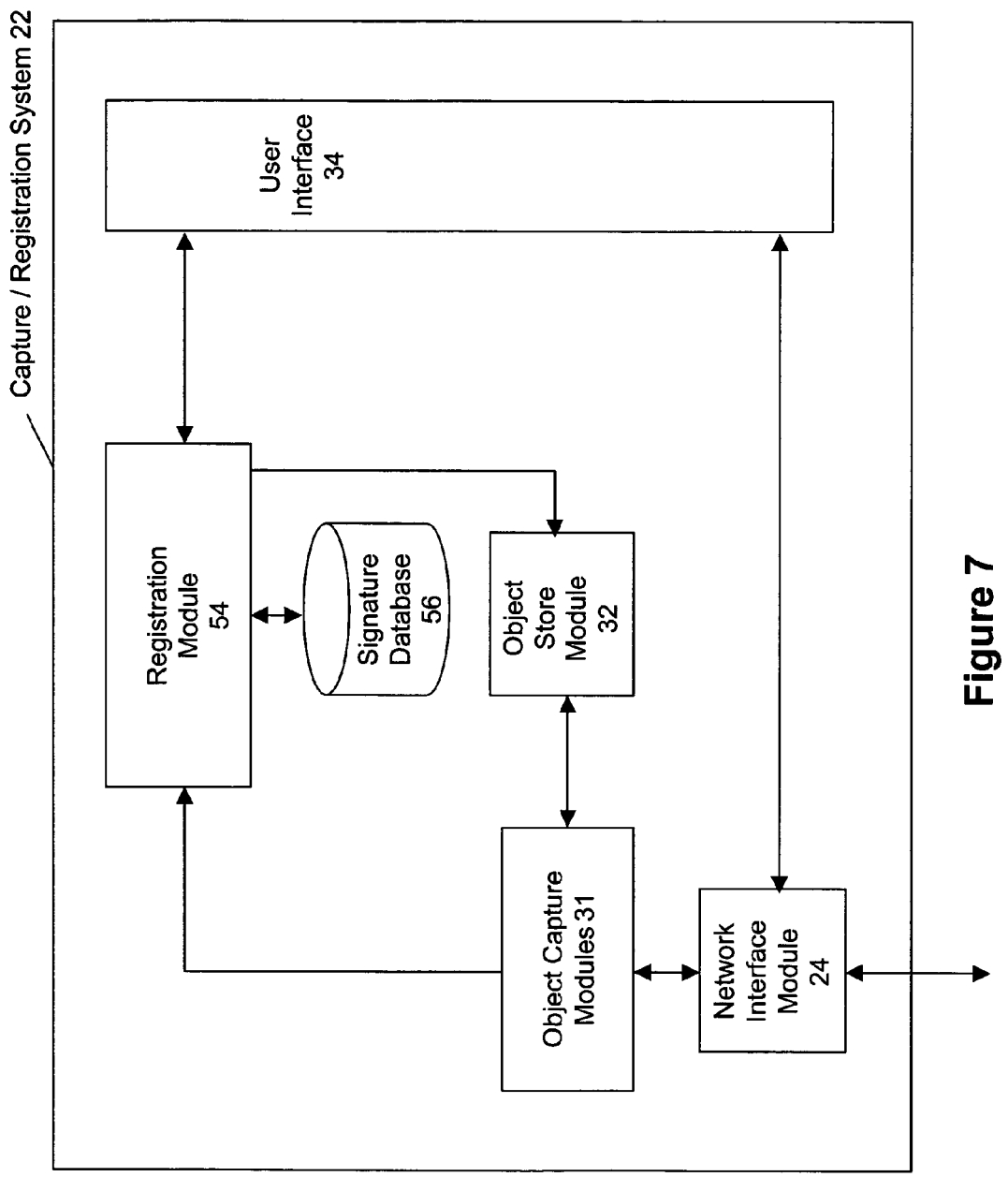
FIG. 7 is a block diagram illustrating a document registration system according to one embodiment of the present invention.

In one embodiment of the present invention, sensitive documents are registered with the capture system 22, although data registration can be implemented using a separate device in other embodiments. One embodiment of implementing registration capability in the capture system 22 is now described with reference to FIG. 7. For descriptive purposes, the capture system 22 is renamed the capture/registration system 22 in FIG. 7, and is also sometimes referred to as the registration system 22 in the description herein. The capture/registration system 22 has components similar or identical to the capture system 22 shown in FIG. 3, including the network interface module 24, the object store module 32, the user interface 34, and the packet capture 26, object assembly 28, and object classification 30 modules, which are grouped together as object capture modules 31 in FIG. 7.

In one embodiment, the capture/registration system 22 also includes a registration module 54 interacting with a signature database 56 to facilitate a registration scheme. In one embodiment, the user can register a document via the user interface 34. There are numerous ways to register documents. For example, a document can be electrically mailed (e-mailed), or uploaded to the registration system 22. The registration system 22 can also periodically scan a file server (registration server) for documents to be registered. The registration process can be integrated with the enterprise's document management systems. Document registration can also be automated and transparent based on registration rules, such as "register all documents," or "register all documents by specific author or IP address," and so on.

After being received, in one embodiment, a document to be registered is passed to the registration module 54. The registration module 54 calculates a signature of the document, or a set of signatures. The set of signatures associated with the document can be calculated in various ways. For example, the signatures can be made up of hashes over various portions of the document, such as selected or all pages, paragraphs, tables and sentences. Other possible signatures include, but are not limited to, hashes over embedded content, indices, headers or footers, formatting information or font utilization. The signatures can also include computations and meta-data other than hash digests, such as Word Relative Frequency Methods (RFM)—Statistical, Karp-Rabin Greedy-String-Tiling-Transposition, vector space models, and diagrammatic structure analysis.

The set of signatures is then stored in the signature database 56. The signature database 56 need not be implemented as a database; the signatures can be maintained using any appropriate data structure. In one embodiment, the signature database 56 is part of the storage complex 52 in FIG. 6.

In one embodiment, the registered document is also stored as an object in the object store module 32. In one embodiment, the document is only stored in the content store 44 with no associated tag, since many tag fields do not apply to registered documents. In one embodiment, one file of files 46 is a "Registered Documents" file.

In one embodiment, the document received from the user is now registered. As set forth above, in one embodiment, the object capture modules 31 continue to extract objects leaving the network, and store various objects based on capture rules. In one embodiment, all extracted objects—whether subject to a capture rule or not—are also passed to the registration module for a determination whether each object is, or includes part of, a registered document.

In one embodiment, the registration module 54 calculates the set of signatures of an object received from the object capture modules 31 in the same manner as of a document received from the user interface 34 to be registered. This set of signatures is then compared against all signatures in the signature database 56. In other embodiment, parts of the signature database can be excluded from this search to save time.

In one embodiment, an unauthorized transmission is detected if any one or more signatures in the set of signatures of an extracted object matches one or more signatures in the signature database 56 associated with a registered document. Other detection tolerances can be configured for different embodiment, e.g. at least two signatures must match. Also, special rules can be implemented that make the transmission authorized, e.g., if the source address is authorized to transmit any documents off the network.

Figure 8:
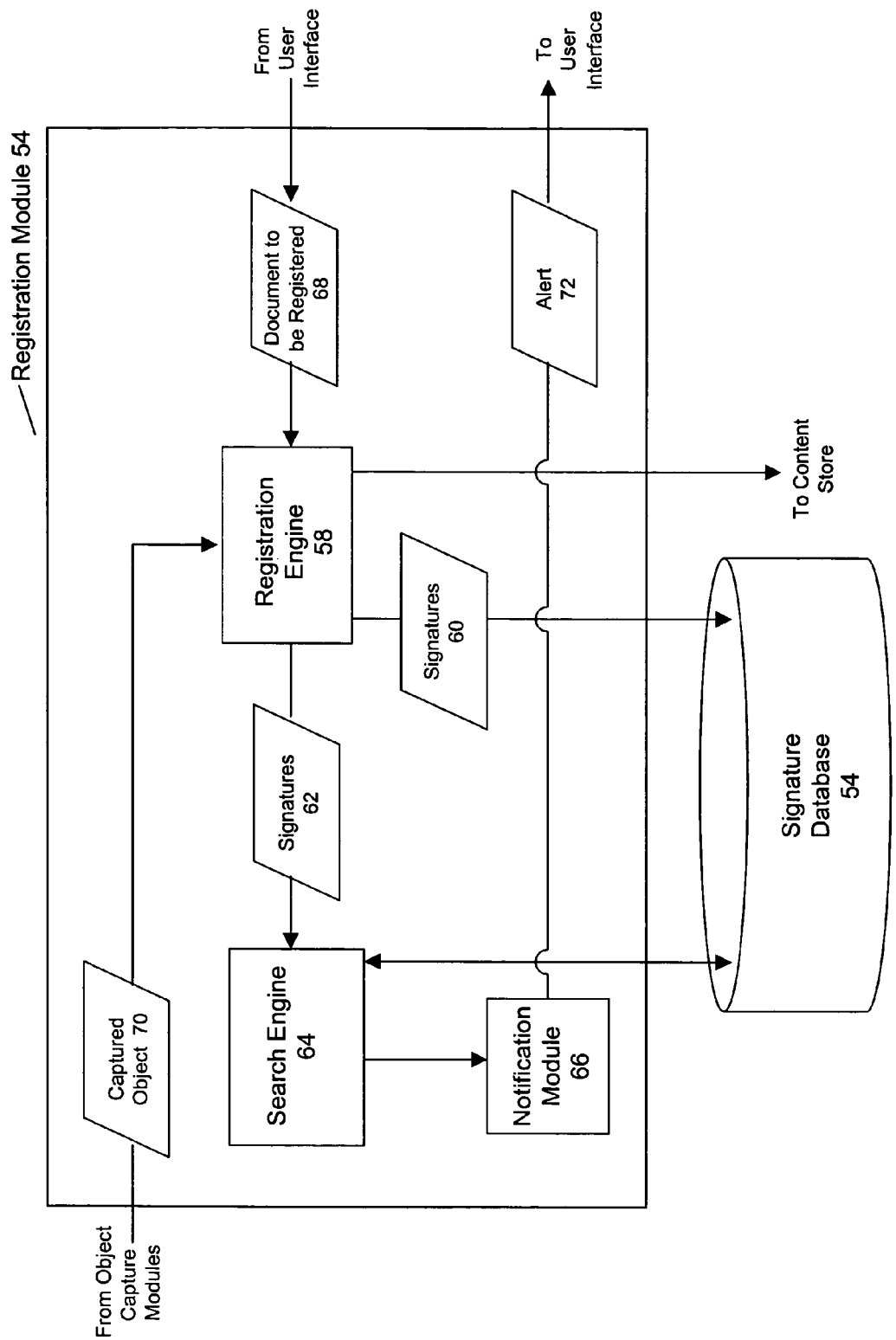
FIG. 8 is a block diagram illustrating registration module according to one embodiment of the present invention.

One embodiment of the registration module 54 is now described with reference to FIG. 8. A discussed above, a document to be registered 68 arrives via the user interface 34. The registration engine 58 generates signatures 60 for the document 68 and forwards the document 68 to the content store 44 and the signatures 60 to the signature database 54. The signatures 60 are associated with the document, e.g., by including a pointer to the document 68, or to some attribute from which the document 68 can be identified.

A captured object 70 arrives via the object capture modules 31. The registration engine calculates the signatures 62 of the captured object, and forwards them to the search engine 64. The search engine 64 queries the signature database 54 to compare the signatures 62 to the signatures stored in the signature database 54. Assuming for the purposes of illustration, that the captured object 70 is a Word document that contains a pasted paragraph from registered PowerPoint document 68, at least one signature of signatures 62 will match a signature of signatures 60. Such an event can be referred to as the detection of an unauthorized transfer, a registered content transfer, or other similarly descriptive terms.

In one embodiment, when a registered content transfer is detected, the transmission can be halted with or without warning to the sender. In one embodiment, in the event of a detected registered content transfer, the search engine 64 activates the notification module 66, which sends an alert 72 to the user via the user interface 34. In one embodiment, the notification module 66 sends different alerts—including different user options—based on the user preference associated with the registration, and the capabilities of the registration system 22.

In one embodiment, the alert 72 can simply indicate that the registered content, i.e., the captured object 70, has been transferred off the network. In addition, the alert 72 can provide information regarding the transfer, such as source IP, destination IP, any other information contained in the tag of the captured object, or some other derived information, such as the name of the person who transferred the document off the network. The alert 72 can be provided to one or more users via e-mail, instant message (IM), page, or any other notification method. In one embodiment, the alert 72 is only sent to the entity or user who requested registration of the document 68.

In another embodiment, the delivery of the captured object 70 is halted—the transfer is not completed—unless the user who registered the document 68 consents. In such an embodiment, the alert 72 can contain all information described above, and in addition, contain a selection mechanism, such as one or two buttons—to allow the user to indicate whether the transfer of the captured object 70 may be completed. If the user elects to allow the transfer, for example because he is aware that someone is emailing a part of a registered document 68 (e.g., a boss asking his secretary to send an email), the transfer is executed and the object 70 is allowed to leave the network.

If the user disallows the transfer, the captured object 70 is not allowed off the network, and delivery is permanently halted. In one embodiment, halting delivery can be accomplished by implementing an intercept technique by having the registration system 22 proxy the connection between the network and the outside. In other embodiments, delivery can be halted using a black hole technique—discarding the packets without notice if the transfer is disallowed—or a poison technique—inserting additional packets onto the network to cause the sender's connection to fail.

Figure 9:
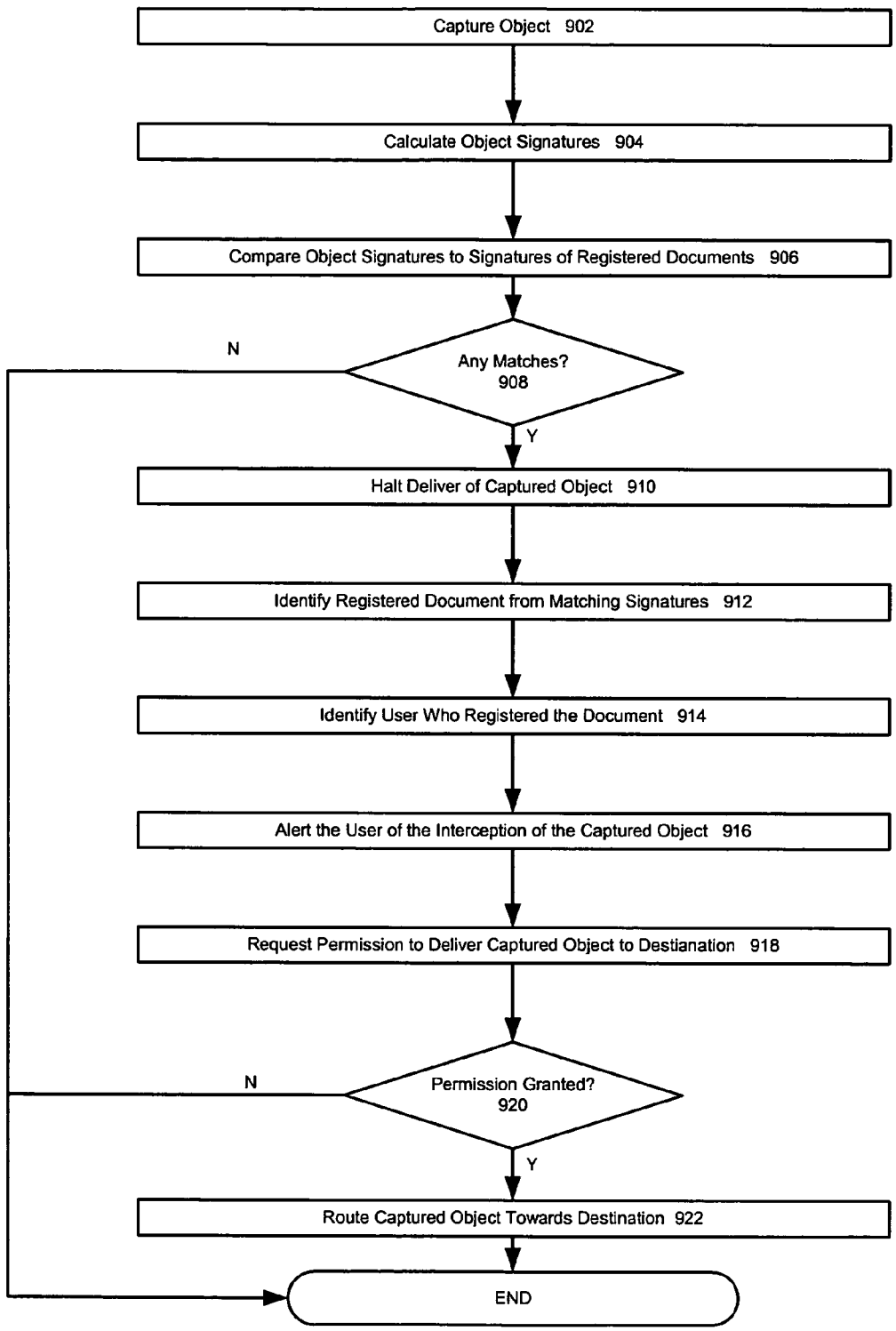
FIG. 9 is a flow diagram illustrating object capture processing according to one embodiment of the present invention.

FIG. 9 provides a flow chart to further illustrate object capture/intercept processing according to one embodiment of the present invention. All blocks of FIG. 9 have already been discussed herein. The example object capture processing shown in FIG. 9 assumes that various documents have already been registered with the registration system 22. The process shown in FIG. 9 can be repeated for all objects captured by the system 22.

Thus, a capture system and a document/content registration system have been described. In the foregoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules, such as the search engine 64 and the notification module 66 in FIG. 8, can be implemented as software or hardware modules, or without dividing their functionalities into modules at all. The present invention is not limited to any modular architectures either in software or in hardware, whether described above or not.

What is claimed is:

1. A method comprising:
maintaining a plurality of stored signatures in a data storage device, each signature being associated with one of a plurality of registered documents;
intercepting packets being transmitted over a network between a source and a destination;
reassembling the packets into an intercepted complete flow, wherein the intercepted complete flow represents an ordered data stream of a communication between the source and the destination;
extracting a reassembled object from the intercepted complete flow, wherein the reassembled object represents a content type;
calculating a set of signatures associated with the reassembled object;
determining the reassembled object contains content associated with a registered document when at least one match is found between the set of signatures and the plurality of stored signatures; and
identifying the registered document.

2. The method of claim 1, further comprising:
halting delivery of the intercepted complete flow in response to determining the reassembled object contains content associated with the registered document.

3. The method of claim 1, further comprising:
registering the plurality of documents according to one or more registration rules.

4. The method of claim 3, wherein the registration rules include at least one of a first rule to register all documents associated with a specified author and a second rule to register all documents associated with a specified Internet Protocol (IP) address.

5. The method of claim 1, wherein the intercepted complete flow includes a plurality of reassembled objects.

6. The method of claim 1, wherein each registered document is associated with a user that requested registration of the document, the user being alerted if an attempt is made to transmit at least a portion of the registered document over a network.

7. The method of claim 1, wherein the set of signatures associated with the reassembled object are calculated by generating a plurality of hashes over various portions of the reassembled object.

8. The method of claim 1, wherein the content associated with the registered document represents a different content type than the content type of the reassembled object.

9. An apparatus comprising:
a network interface module to connect the apparatus to a network; and
a processor operable to execute instructions for capturing and evaluating data transmissions over the network, including:
intercepting packets being transmitted over the network between a source and a destination;
reassembling the packets into an intercepted complete flow, wherein the intercepted complete flow represents an ordered data stream of a communication between the source and the destination;
extracting a reassembled object from the intercepted complete flow, wherein the reassembled object represents a content type;

calculating a set of signatures associated with the reassembled object; and determining the reassembled object contains content associated with a registered document when at least one match is found between the set of signatures and the plurality of stored signatures; and identifying the registered document.

10. The apparatus of claim 9, wherein the processor is operable to execute further instructions including:

halting delivery of the intercepted complete flow in response to determining the reassembled object contains content associated with the registered document.

11. The apparatus of claim 9, wherein the processor is operable to execute further instructions including:

registering the plurality of documents according to one or more registration rules, wherein the registration rules include at least one of a first rule to register all documents associated with a specified author and a second rule to register all documents associated with a specified Internet Protocol (IP) address.

12. The apparatus of claim 9, wherein the intercepted complete flow includes a plurality of reassembled objects.

13. The apparatus of claim 9, wherein each registered document is associated with a user that requested registration of the document, the user being alerted if an attempt is made to transmit at least a portion of the registered document over a network.

14. The apparatus of claim 9, wherein the content associated with the registered document represents a different content type than the content type of the reassembled object.

15. One or more non-transitory computer readable storage media that store instructions for execution and when executed by a processor are operable to perform operations comprising:

maintaining a plurality of stored signatures in a data storage device, each signature being associated with one of a plurality of registered documents;

intercepting packets being transmitted over a network between a source and a destination;

reassembling the packets into an intercepted complete flow, wherein the intercepted complete flow represents an ordered data stream of a communication between the source and the destination;

extracting a reassembled object from the intercepted complete flow, wherein the reassembled object represents a content type;

calculating a set of signatures associated with the reassembled object; and determining the reassembled object contains content associated with a registered document when at least one match is found between the set of signatures and the plurality of stored signatures; and identifying the registered document.

16. The non-transitory computer readable storage media of claim 15, the processor being operable to perform further operations including:

halting delivery of the intercepted complete flow in response to determining the reassembled object contains content associated with the registered document.

17. The non-transitory computer readable storage media of claim 15, the processor being operable to perform further operations including:

registering the plurality of documents according to one or more registration rules, wherein the registration rules include at least one of a first rule to register all documents associated with a specified author and a second rule to register all documents associated with a specified Internet Protocol (IP) address.

18. The non-transitory computer readable storage media of claim 15, wherein the intercepted complete flow includes a plurality of reassembled objects.

19. The non-transitory computer readable storage media of claim 15, wherein the set of signatures associated with the reassembled object are calculated by generating a plurality of hashes over various portions of the reassembled object.

20. The non-transitory computer readable storage media of claim 15, wherein the content associated with the registered document represents a different content type than the content type of the reassembled object.

* * * * *